(12) United States Patent
Ghali

(10) Patent No.: US 7,193,338 B2
(45) Date of Patent: Mar. 20, 2007

(54) METHOD FOR TAPPING A HIGH VOLTAGE TRANSMISSION LINE AND SUBSTATION USING THE SAME

(76) Inventor: Gamal A. Ghali, 55 Cote Ste-Catherine, Apt. 1102, Outremont, Quebec (CA) H2V 2A5

( * ) Notice: Subject to any disclaimer, the term of this patent is extended or adjusted under 35 U.S.C. 154(b) by 542 days.

(21) Appl. No.: 10/655,733

(22) Filed: Sep. 5, 2003

(65) Prior Publication Data

US 2005/0052801 A1   Mar. 10, 2005

(51) Int. Cl.
*H02G 1/16* (2006.01)
*H02B 11/26* (2006.01)

(52) U.S. Cl. .......................................... 307/147; 361/62
(58) Field of Classification Search ................ 361/35, 361/64, 66, 62, 38; 307/147, 113, 115; 218/4
See application file for complete search history.

(56) References Cited

U.S. PATENT DOCUMENTS

| | | | | |
|---|---|---|---|---|
| 3,378,731 A | * | 4/1968 | Whitehead | ................. 361/603 |
| 4,092,547 A | * | 5/1978 | Ruppert | ....................... 307/113 |
| 4,881,147 A | * | 11/1989 | Schaff | ......................... 361/118 |
| 5,648,888 A | * | 7/1997 | Le Francois et al. | ....... 361/603 |
| 5,940,260 A | * | 8/1999 | Gelbien et al. | ............... 361/62 |
| 6,219,570 B1 | * | 4/2001 | Mueller et al. | ............. 600/410 |
| 6,496,342 B1 | * | 12/2002 | Horvath et al. | ............... 361/65 |

* cited by examiner

*Primary Examiner*—Brian Sircus
*Assistant Examiner*—Andrew Deschere
(74) *Attorney, Agent, or Firm*—Fulbright & Jaworski L.L.P.

(57) ABSTRACT

A method of tapping a high voltage transmission line for input into a power distribution substation is disclosed. The method comprises the steps of dividing the transmission line and attaching the conductors to the primaries of at least two transformers via a series connected first disconnect switch, second disconnect switch and circuit breaker. A bus interconnects the first disconnect switch and the second disconnect switch and the bus of the first transformer bay is connected to the bus of the second transformer bay using a circuit breaker. A system for the conversion of tapped high voltage electricity to medium voltage electricity is also disclosed.

15 Claims, 8 Drawing Sheets

FIG_2

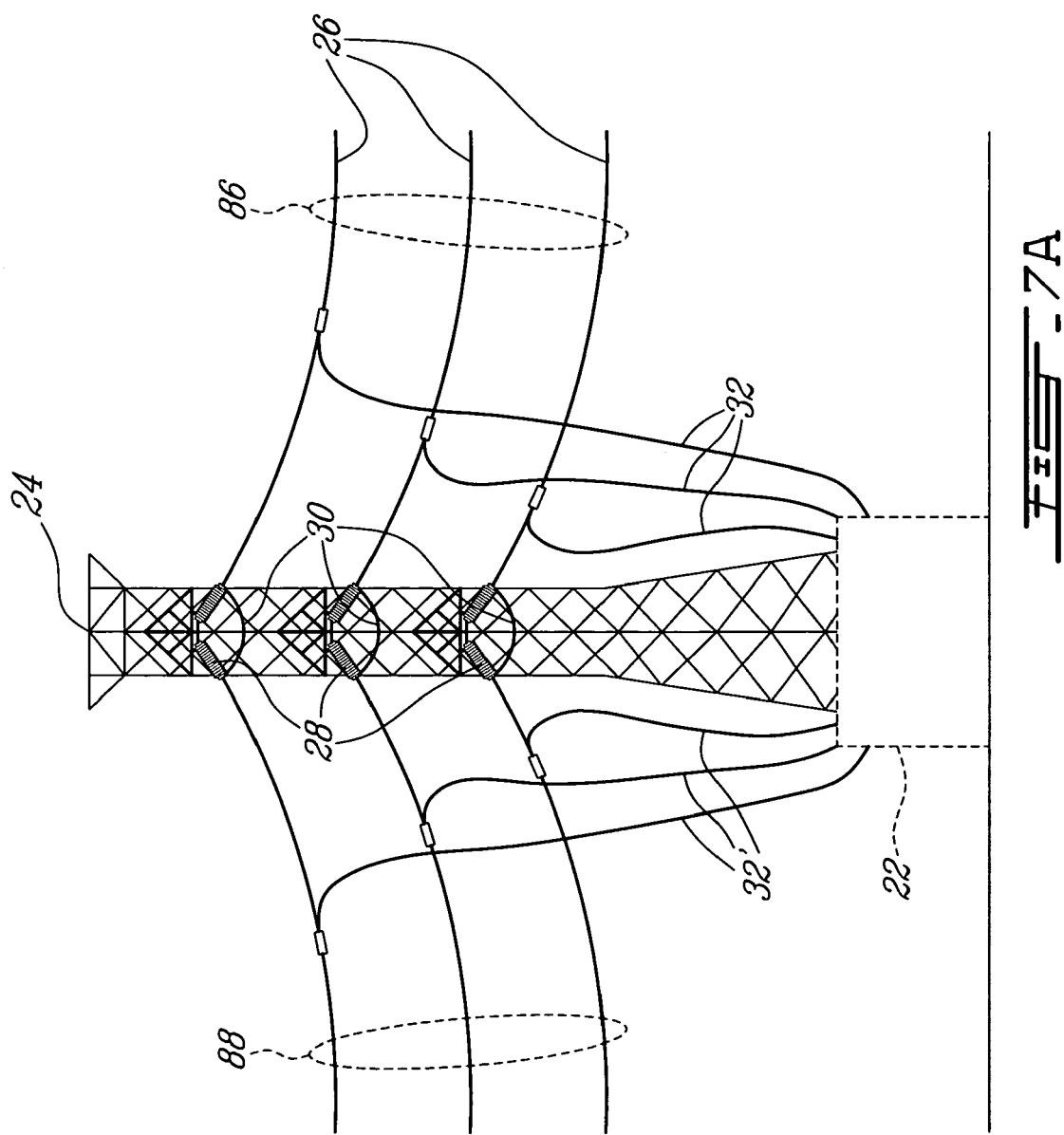

METHOD FOR TAPPING A HIGH VOLTAGE TRANSMISSION LINE AND SUBSTATION USING THE SAME

FIELD OF THE INVENTION

The present invention relates to a method for tapping a high voltage transmission line by a substation. In particular, the present invention relates to a non-conventional substation which can tap directly into a high voltage transmission line in order to step down the voltage to connect to a distribution grid or a large industrial, commercial or institutional user.

BACKGROUND OF THE INVENTION

Electrical distribution systems are an essential part of the electrical power system. In order to transfer power from the place of generation to the place of use, some type of transmission network must be utilised. A large transmission system, of the type designed to transfer large amounts of energy to a large number of users, involves a system of interconnected power transmission lines originating at the electrical power generating stations (or power plants), which are typically dispersed over a wide area, with the ultimate purpose of the transmission lines being to bring the electrical power necessary for industrial, residential and commercial use to its point of utilisation.

In North America, the transmission of electrical power is largely in the form of a three phase alternating current (although there is some use of High Voltage DC, or HVDC, for transmission of large quantities of power over considerable distances). Power generating stations are typically located at some distance from the point of utilisation. For example, in Canada the James Bay Hydro Electric project, which has five major power stations producing a total of around 15,000 MW of power, is located in remote north west corner of the province of Quebec. The transmission lines, which are used to supply major urban centres in the south, extend over many hundreds of miles. The transmission lines, which are suspended from large steel towers, transfer three phase power at 60 cycles per second and an extra high voltage of 735 kV.

Closer to the points of utilisation, extra high voltage transmission lines are typically terminated by transmission substations where a reduction in voltage occurs for distribution to other points in the system through a medium voltage (MV) distribution grid. These MV transmission lines are typically referred to as the primary distribution network. Additionally, further voltage reductions for commercial and residential customers can take place at distribution substations, which connect to the primary distribution network.

Utility transmission and distribution systems link the power generating stations with end users through a network of power lines and associated components. In North America, typically the transmission portion of the system is designated as operating at 69 kilovolts (kV) and above, while the distribution portion operates between 110 volts and 46 kV.

Distribution networks are connected to the transmission portion of the system via transmission lines and substations. Similar to the transmission substations, distribution substations provide the link between a higher voltage transmission lines and a lower voltage transmission lines. The function of a distribution substation is to receive electrical power from the high voltage transmission and convert it to voltage levels suitable for industrial, commercial or residential use. Distribution substations are provided at various points throughout an electrical supply infrastructure.

The prior art reveals distribution substations engineered to provide power for a large number of users. These substations in many cases terminate the transmission line and as a result must maintain a high level of service. Consequently, they are designed with a large amount of redundancy in terms of transformers, disconnect switches, circuit breakers, bus bars and the like in order to provide continued operation under failure or high load. This in turn makes them large, resulting in a distribution substation having many components which is spread over a large area. Additionally, such prior art distribution substations are typically located at some distance to the high voltage transmission lines thus requiring the provision of an additional high voltage line between the transmission lines and the distribution substation. This gives rise to additional costs for erecting towers and running cabling as well as those related to the acquisition of land or grant of right of ways in order to ensure the unobstructed passage of these conductors.

In rural service areas the concentration of users is low and costs related to deploying a conventional substation are prohibitive. As a result, in many cases a power utility will not be able to generate an adequate return on the large investment necessary to bring a conventional distribution substation on line. On the other hand, rural users are typically satisfied with a lower quality of service and are willing to suffer some power outages if this means they will have access to electrical power at a reasonable price. Additionally, high voltage transmission lines on their path from power source to major urban centres typically traverse many rural areas to which they do not supply electricity.

In order to address the above drawbacks, the prior art reveals relatively small substations which can be located close to or underneath extra high voltage transmission lines. These non-conventional substations tap directly into the over head transmission lines using tapping through high voltage connectors as known in the art and do not otherwise interrupt the flow of power along the transmission line. Additionally, as the non-conventional substations provide a single transformer, no bus bar, which is used to interconnect transformers, is required. Also, only a single disconnect switch and circuit breaker is required. As a simple and cheaper alternative the circuit breaker can be replaced by a disconnect switch (or a load break switch) and set of fuses, significantly reducing the amount of equipment necessary to ensure operation of the non-conventional substation.

One drawback of the above non-conventional substations is that they do not provide any redundancy in the case of failure of one of the components of the substation or overload.

SUMMARY OF THE INVENTION

The present invention addresses the above and other drawbacks by providing for a method of tapping a high voltage transmission line for input into a power distribution substation, the high voltage transmission line being suspended by a suspension tower, the method comprising the steps of:

Dividing the transmission line into a first conducting line and a second conducting line by removing a bypass loop to sever the transmission line at the suspension tower such that the first conducting line is terminated at a first side of the suspension tower and the second conducting line is terminated at a second side of the suspension tower, wherein the first conducting line is insulated from the second conducting line;

providing at least two transformer (or switching) bays at the substation, each transformer bay having a primary input connected to the primary of a power transformer, the primary input comprising a series connected first disconnect switch, second disconnect switch and circuit breaker, wherein a bus interconnects the first disconnect switch and the second disconnect switch and an output of the circuit breaker is attached to the primary of the power transformer;

interconnecting the bus of the first transformer bay to the bus of the second transformer bay using a circuit breaker; and connecting the first conducting line to the primary input of the first transformer bay using a first high voltage conductor and connecting the second conducting line to the primary input of the second transformer bay using a second high voltage conductor.

In a particular embodiment of the method, the transmission line is suspended by a suspension tower and the dividing step comprises severing the transmission line at the suspension tower such that the first conducting line is terminated at a first side of the suspension tower and the second conducting line is terminated at a second side of the suspension tower.

Additionally, there is provided a method wherein the transmission line is a three phase transmission line having at least one conductor for each phase and wherein the dividing step comprises severing each conductor of each phase and inserting an insulating medium between the severed ends of each conductor (or utilising the existing insulators as the insulating medium). In a particular embodiment, the insulating medium is air, or is selected from the group consisting of porcelain, glass or epoxy and the voltage of the transmission line is between 65 kV and 765 kV.

The present invention also addresses the above and other drawbacks by providing for a system for the conversion of high voltage electricity on a transmission line to medium voltage electricity comprising:

An insulator dividing the transmission line into a first conducting line and a second conducting line;

a substation comprising two transformer bays, each transformer bay comprising a primary input, switching equipment, and a power transformer, the primary input connected to the primaries of the power transformer through the switching equipment, the switching equipment comprising a series connected first disconnect switch, second disconnect switch and circuit breaker, wherein a bus interconnects the first disconnect switch and the second disconnect switch and wherein the secondaries of the power transformer output the medium voltage electricity;

a circuit breaker interconnecting the bus of the first transformer bay to the bus of the second transformer bay; and first and second high voltage conductors for tapping the high voltage transmission line at one location on the high voltage transmission line, the first high voltage conductor connecting the first conducting line to the primary input of the first transformer bay and the second high voltage conductor connecting the second conducting line to the primary input of the second transformer bay; and a suspension tower at the location, the suspension tower suspending the high voltage transmission line and having a bypass loop removed to provide first and second connection points, the first conducting line for joining to the first high voltage conductor at the first connection point on a first side of the tower, and the second conducting line for joining to the second high voltage conductor at the second connection point on a second side of the tower.

In a particular embodiment, the transformer bays further comprise a lightening arrester connected to each primary of the power transformer. In another particular embodiment, the insulator is air, or is selected from the group consisting of porcelain, glass, or epoxy.

Additionally, there is provided a system wherein the transmission line is suspended from a suspension tower, the first conducting line on a first side of the tower and a the second conducting line on a second side of the tower.

There is also provided a system wherein the high voltage electricity is between 65 kV and 765 kV and the medium voltage electricity is between 4 kV and 46 kV.

Furthermore, there is provided a system wherein the transmission line is a three phase transmission line having at least one conductor for each phase and wherein the first and second conducting lines and the first and second high voltage conductors each comprise three conductive cables, one of the cables for each phase.

BRIEF DESCRIPTION OF THE DRAWINGS

FIG. 7A provides a side plan view of a suspension tower and tapped transmission line in accordance with an illustrative embodiment of the present invention.

DETAILED DESCRIPTION OF THE ILLUSTRATIVE EMBODIMENTS

Figure 1:
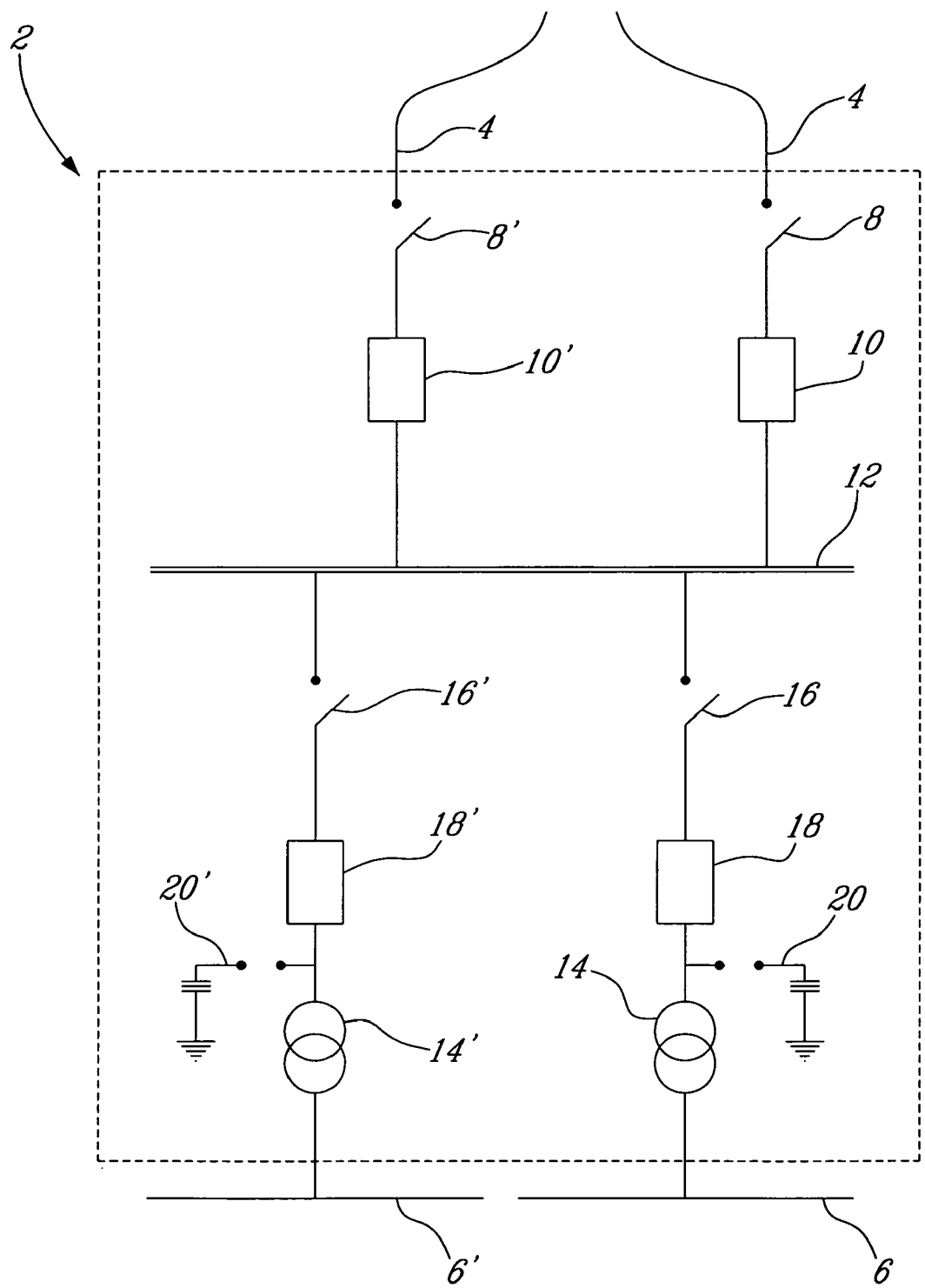
FIG. 1 provides a schematic diagram of a prior art substation.

Referring now to FIG. 1, a prior art embodiment of a conventional substation is provided. In the prior art substation, generally referred to using the reference numeral 2, bulk electric power at high voltages is fed into the substation 2 by a high voltage or extra high voltage three phase AC high voltage transmission line 4 (having a voltage of typically between 69 kV and 765 kV). The high voltage or extra high voltage is reduced by the substation 2 to a voltage which is suitable for distribution via one or more power lines as in 6, typically at a voltage of between 4 kV and 46 kV, depending on implementation. The power lines 6 can, for example, serve as the primary feeders of a utility's distribution grid. It will be apparent to a person of ordinary skill in the art that although only a single conductor is shown, in a three phase embodiment a multiple of three conductors is required per transmission path.

Within the substation 2, the high voltage transmission line 4 is terminated by a disconnect switch 8 and circuit breaker 10 connected in series, with the circuit breaker 10 being in turn attached to a bus bar 12. The bus bar allows, for example, the high voltage transmission line 4 to be terminated by a second disconnect switch 8'/circuit breaker 10' pair, with the circuit breaker 10' being attached to the bus bar 12 in the same manner as that of circuit breaker 10. The provision of a bus bar allows the high voltage transmission line 4 to be terminated by a plurality of disconnect switch/circuit breaker pairs connected in parallel which provides for redundancy or allows for the exchange of existing disconnect switch/circuit breaker pairs without interruption of service. As is well known to persons of ordinary skill in the art, a variety of configurations of bus bars, disconnect switches and circuit breakers can be used to achieve a given redundancy and fault tolerance.

Still referring to FIG. 1, in order to reduce the voltage to the lower levels which are suitable for distribution via the power line 6, the high voltage or extra high voltage electricity is fed into a power transformer 14 via a further disconnect switch 16 and circuit breaker 18 pair. Additionally, a lightening arrester 20 is typically provided for to allow for the grounding of the excessively high voltages that are caused by lighting strikes and other system problems. Once again, the provision of a bus bar 12 allows for additional power transformers as in 14' to be connected in parallel with power transformer 14 via additional disconnect switch 16' and circuit breaker 18' pairs in order to provide for a more robust system or increase the output power of the substation. Alternatively, the second power transformer 14' can be used to feed a different power line 6'.

Figure 2:
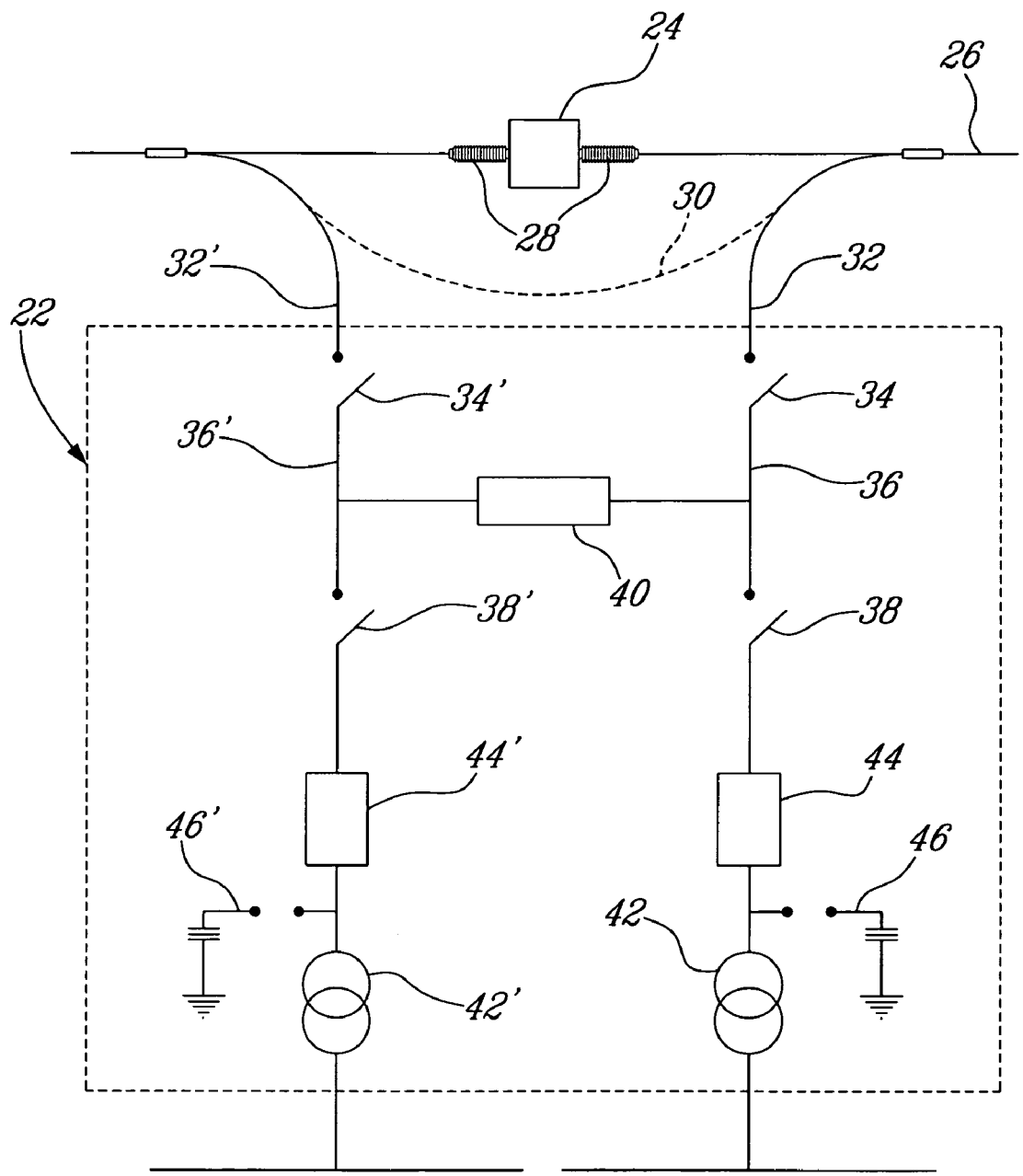
FIG. 2 provides a schematic diagram of a distribution substation in accordance with an illustrative embodiment of the present invention.

Referring now to FIG. 2, an illustrative embodiment of a non-conventional substation in accordance with the present invention will be described. It will again be understood by a person of ordinary skill in the art that, although only a single conductor is shown in the present schematic diagram, the system illustrated is typically operated using a three phase AC current requiring at least one conductor for each phase.

The non-conventional substation, generally referred to using the reference numeral 22, is preferably located in proximity to an existing suspension tower 24 from which a high voltage transmission line 26 is suspended, or underneath the high voltage transmission line itself, although it will be understood by one of ordinary skill in the art that the non-conventional substation 22 could be located at some distance from the high voltage transmission line 26, with the provision of a suitable interconnecting high voltage transmission link.

The suspension tower 24 suspends the high voltage transmission line 26 using insulators as in 28. A bypass loop 30 is typically formed in the conductors of the high voltage transmission line 26 in order to bypass the steel structure of the suspension tower 24. The high voltage transmission line 26 is conveniently divided at the bypass loop 30 and high voltage conductors 32, 32' attached to the free ends of the transmission line 26 providing the transmission of bulk electric power at high voltages to the non-conventional substation 22.

Each of the high voltage conductors 32, 32' from the high voltage transmission line 26 are terminated in a disconnect switch 34, 34' which is in turn connected by means of a higher bus 36, 36' to a second disconnect switch 38, 38'. The higher busses 36, 36' are in turn tied together by means of a circuit breaker 40 which provides for the eventual flow of electricity between the busses 36, 36'. The second disconnect switch 38, 38' are each connected to a power transformer 42, 42' via a circuit breaker 44, 44'. Lightening arresters as in 46, 46' are also provided for in a given implementation to reduce the effect of lightening strikes and the like.

Each transformer 42, 42' is designed to reduce the voltage of the bulk electric power fed into the non-conventional substation 22 via the high voltage transmission line 26 to a level which is suitable for feeding into one or more power lines as in 48, 48'. In this regard, it is foreseen that the non-conventional substation 22 depending on user requirements may be provided with transformers having a primary voltage class ranging from between 69 kV and 765 kV and a secondary class ranging from between 4 kV and 46 kV. Of course it will be understood by a person of ordinary skill in the art that a given transformer will typically be designed to transfer a given amount of power from a given input voltage to a given output voltage.

It will also be understood that the capacity of each transformer bay can be increased by adding additional transformers (not shown) and connecting them to their respective higher bus 36, 36' via appropriate conductors and a series connected disconnect switch and circuit breaker (all not shown). A lightening arrester may also be attached between the primary of the added transformer and the ground (all not shown).

Figure 3:
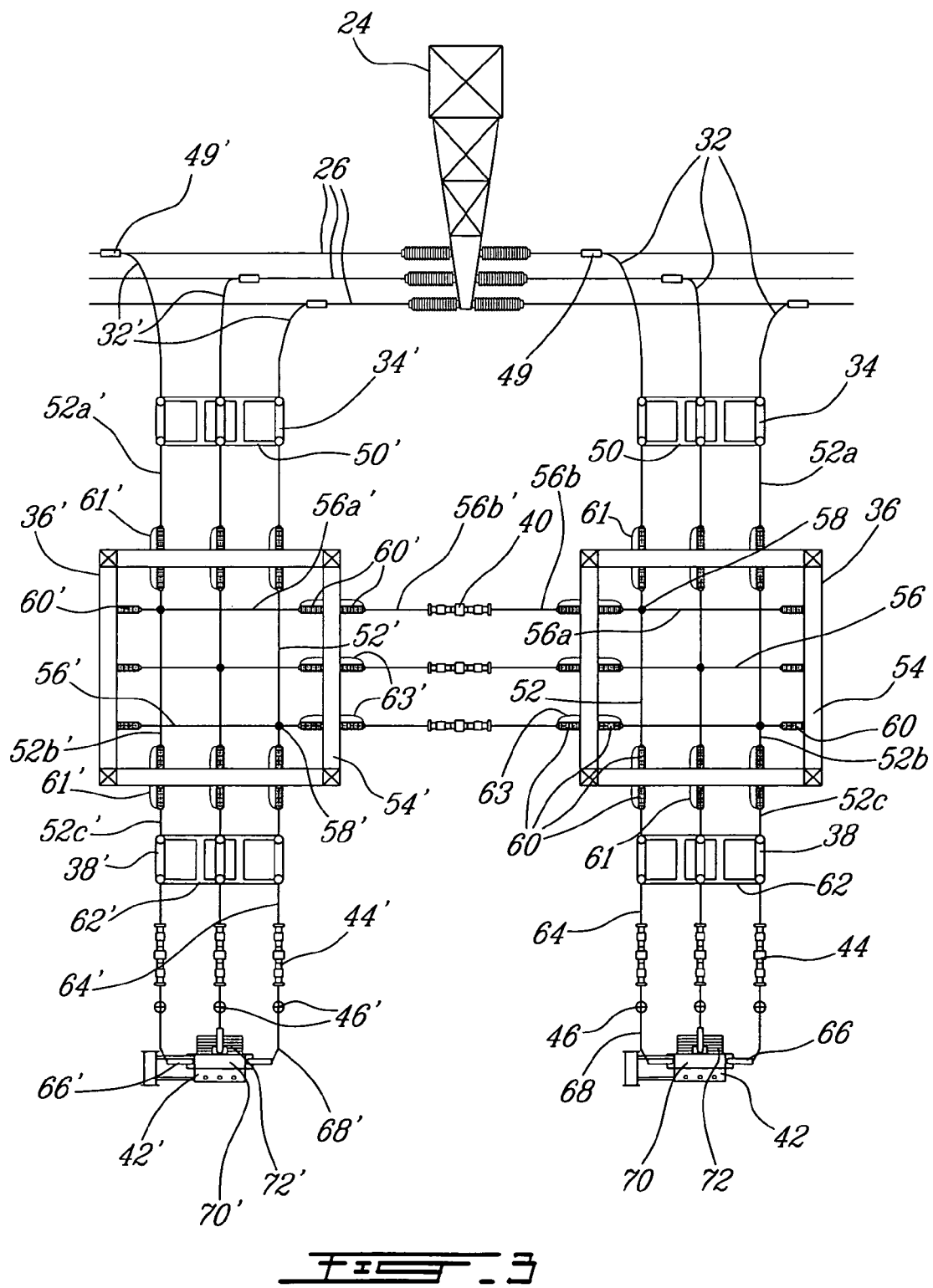
FIG. 3 provides a top plan view of a distribution substation in accordance with an illustrative embodiment of the present invention.
Figure 4:
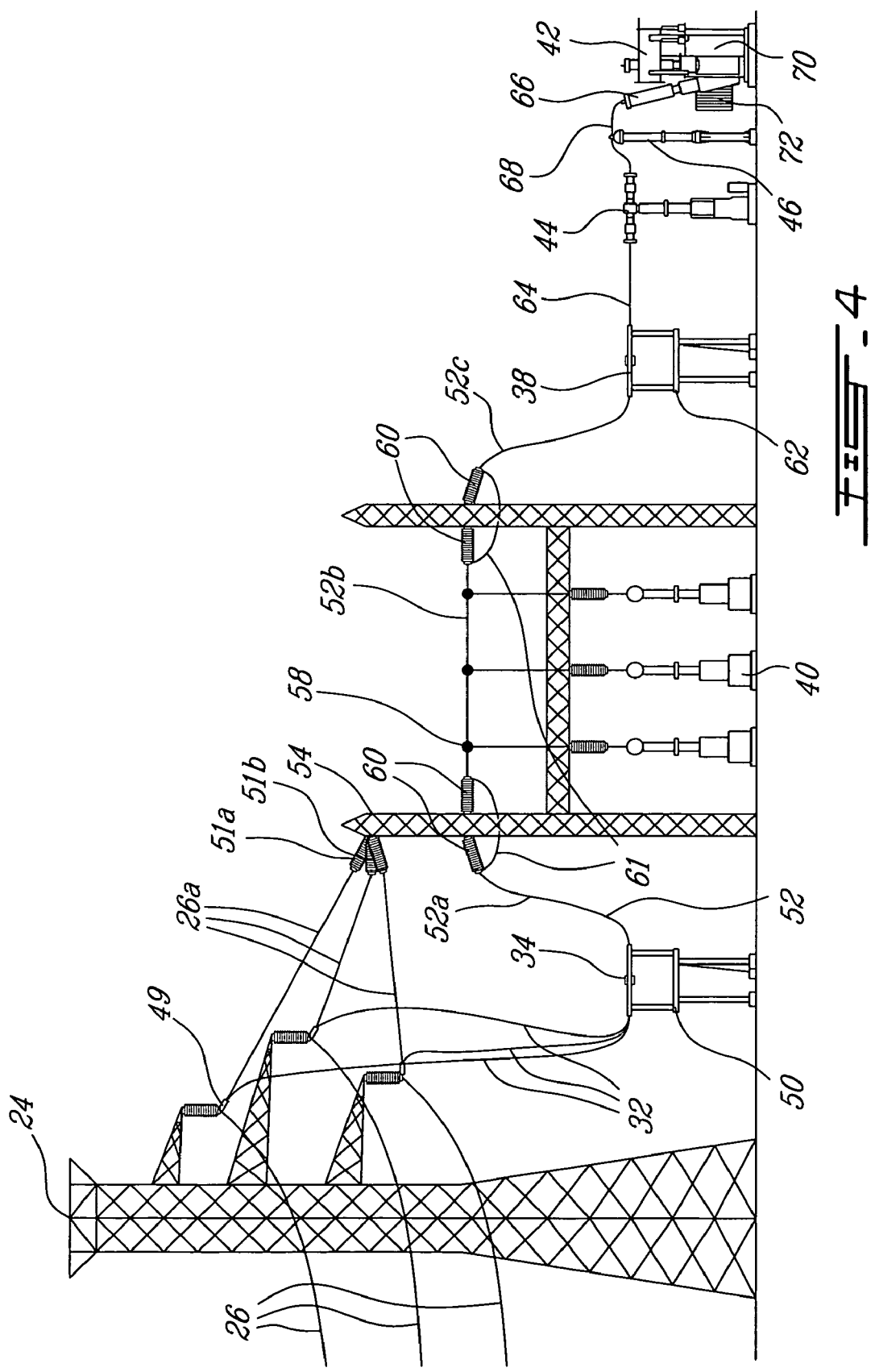
FIG. 4 provides a side plan view of a distribution substation in accordance with an illustrative embodiment of the present invention.

Referring now to FIG. 3 and FIG. 4 in addition to FIG. 2, an illustrative embodiment of an outdoor 220 kV non-conventional substation will now be described. It will be understood that although in the figures in many cases an element only on a single phase is referenced using a given reference numeral (in order to help improve the clarity of the figures), the illustrated system is a three phase system and therefore the references should be understood, where applicable, to be also referring to the same elements on the other phases.

Two groups of three high voltage conductors as in 32 and 32', which are manufactured for example from stranded aluminium with a steel core and having a cross section to meet the requisite current requirements, are connected through high voltage connectors as in 49, 49' into the individual conductors of the transmission line 26. The two groups of three high voltage conductors, 32, 32' are fed into horizontally mounted three phase disconnect switches 34, 34' mounted on steel support structures 50, 50' via high voltage terminals (not shown). It will be understood to a person of ordinary skill in the art that there could be more than 3 high voltage conductors as in 32, 32' depending on the number of conductors used per phase.

Referring now to FIG. 4, in an alternative illustrative embodiment the terminated ends as in 26a of the conductors of the transmission line 26 can be suspended from a steel support structure as in 54 by means of appropriate insulators 51a and voltage terminals 51b. Some sagging can be allowed in the terminated ends 26a in order to reduce mechanical tension, however care must be taken to ensure that appropriate ground clearances are maintained. The high voltage conductors (or droppers) as in 32 are then fed into the horizontally mounted disconnect switches 34 via high voltage terminals (not shown).

Referring back to FIG. 2 and FIG. 3 in addition to FIG. 4, in the present illustrative embodiment the disconnect switches are, for example, three pole gang-operated motorised disconnect switches manufactured in accordance with IEC 129 (1984) and designed to operate at a nominal service voltage of 220 kV RMS at 60 cycles per second with a rated continuous current of 1200 A RMS.

In an alternative illustrative embodiment, and depending on requirements, capacitor voltage transformers (CVTs) with wave traps (both not shown) can be interposed between each high voltage conductor as in 32, 32' and the disconnect switches 34, 34'. The CVTs, for example, are pedestal mounted oil filled CVTs having a capacitance of 7500 pF with a line trap mounted on top. They are designed to operate at a nominal system voltage of 220 kV at 60 cycles per second. The CVTs are used, for example, to convert the transmission class voltages to standardised low and easily measurable values, which can then be used for metering, protection and control of the high voltage system in general and the non-conventional substation 22 in particular. Additionally, appropriately equipped CVTs can be used for coupling high frequency power line carrier signals to the transmission line for high frequency data transmission.

The disconnect switches 34, 34' are in turn connected to the second disconnect switches 38, 38' via a series of conductors as in 52, 52'. The conductors 52 and 52' are each comprised of three subsections, 52a, 52b, 52c and 52a', 52b', 52c' with subsections 52b, 52b' forming part of their respective three phase higher busses 36, 36'. As will now be apparent to a person of ordinary skill in the art, subsections 52a, 52a' connect the disconnect switches 34, 34' to the higher busses 36, 36' which are in turn connected to the disconnect switches 38, 38' by means of subsections 52c, 52c'.

The higher busses 36, 36' are further comprised of a metal superstructure 54, 54' manufactured from heavy steel or other suitable material which supports the series of conductors as in 52b, 52b' and an additional series of conductors as in 56, 56' which are substantially at right angles to the series of conductors as in 52b, 52b' but at a lower (or alternatively higher) level allowing for the requisite clearance. Conductors 56, 56' are each comprised of two subsections 56a, 56b and 56a', 56b', with subsections 56a, 56a' forming part of their respective lower busses and, as will be seen below, with subsections 56b, 56b' providing the interconnection between the subsections 56a, 56a' and the circuit breaker 40.

The series of conductors as in 56a, 56a' are suitably interconnected to the higher busses 36, 36' at subsections 52b, 52b' by droppers 58, 58'. The conductors 52b, 52b' and 56a, 56a' are suspended from the superstructures 54, 54' as known in the art by means of insulator sets as in 60, 60', typically manufactured from porcelain, glass, epoxy or the like. Additionally, the conductor sections 52b, 52b' are interconnected with conductor subsections 52a, 52a' and 52c, 52c' via by pass sections as in 61, 61' as are well known in the art. Similarly, conductor subsections 56a, 56a' are interconnected with conductor subsections 56b, 56b' also via by pass sections as in 63, 63'.

The conductor subsections 56b, 56b' are terminated by a three (3) pole circuit breaker 40 which, through the series of conductors 56, 56', ties together the higher buses 36, 36'. The circuit breaker 40, for example, is comprised of a bank of three horizontally mounted AC circuit breakers (one for each phase) designed for a nominal service voltage of 220 kV RMS at 60 cycles per second. The entire circuit breaker assembly has a rated current of 1250 A and a maximum symmetrical interrupting capability at rated voltage of 31.5 kA. The circuit breaker 40 is, for example, of the spring loaded-motorised type, filled with sulphur hexafluoride (SF$_6$) gas as an insulating media and manufactured and tested according to IEC 56.

In the present embodiment conductors 52, 52' (comprised of subsections 52a, 52b, 52c and 52a', 52b', 52c'), extend from the disconnect switches 34, 34' through the superstructures 54, 54' and are terminated by a second disconnect switch 38, 38'. Similar to the disconnect switches 34, 34', disconnect switches 38, 38' are horizontally mounted on steel support structures 62, 62' and are, for example, three pole gang-operated motorised disconnect switches manufactured in accordance with IEC 129 (1984) and designed to operate at a nominal service voltage of 220 kV RMS at 60 cycles per second with a rated continuous current of 1200 A RMS.

A series of conductors as in 64, 64' exit the disconnect switches 38, 38' and are terminated by a three (3) pole transformer circuit breaker as in 44, 44'. Similar to the tie circuit breaker 40, each transformer circuit breaker 44, 44', for example, is comprised of a bank of three horizontally mounted AC circuit breakers (one for each phase) designed for a nominal service voltage of 220 kV RMS at 60 cycles per second. The entire circuit breaker assembly has a rated current of 1250 A and a maximum symmetrical interrupting capability at rated voltage of 31.5 kA. The transformer circuit breakers 44, 44' are, for example, of the spring loaded-motorised type, filled with sulphur hexafluoride (SF$_6$) gas as an insulating media and manufactured and tested according to IEC 56.

The transformer circuit breakers 44, 44' serve to isolate the primary of the transformers 42, 42' from the high voltage transmission line 26 in case of malfunction or non-use. The transformer circuit breakers 44, 44' are connected to the primary bushings 66, 66' of the transformers 42, 42' by means of a series of conductors as in 68, 68'. The windings (not shown) of the transformers 42, 42', fabricated for example from copper, are immersed in oil provided in the stainless steel tank 70, 70'. Three phase two- or three-winding transformers can be used in the system, and are, for example, typically of the multi-stepped core type to reduce no-load and load losses. In the present illustrative embodiment, the transformers 42, 42' are designed for operation with a nominal service voltage of 220 kV RMS at 60 cycles per second with a nominal rating of 10,000 kVA and are of the three phase type, being oil filled with a sealed tank construction for outdoor use and having a stacked core design with circular concentric copper windings. Cooling of the transformers 42, 42' is illustratively of the ONAN type, that is using a mineral oil or other synthetic insulating liquid having a fire point $\leq 300°$ C. with natural convection flow through the cooling equipment and windings. Air with natural convection over the cooling fins, 72, 72', provides the external cooling medium. However, it will be apparent to one of ordinary skill in the art that other transformer types could be used depending on the implementation.

A series of lightening arresters 46, 46' are interposed between the transformers 42, 42' and the transformer circuit breakers 44, 44' and in electrical contact with both of these via the conductors 68, 68'. In the present illustrative embodiment, the lightening arresters 46, 46' are station type ungapped metal oxide lightening arresters having a voltage rating per ANSI C62.1 (1981) of 192 kV RMS.

In order to adequately protect and control the substation 22 the use of instrument transformers (both current and voltage) is foreseen. As known in the art, these transformers sense the current and voltages in the system by reducing these to readable values according to a predetermined ratio, thereby allowing the very high currents and voltages flowing through the system to be measured using instruments that would otherwise be destroyed or severely damaged.

Although the manner in which protection and control is carried out may vary from implementation to implementation and will depend to a large degree on the strategies being used by the utility which is operating the transmission and distribution networks, preferably CVTs and wave traps as described hereinabove would be implemented on the primary (high voltage) side of the substation in order to protect communications on the transmission line and also in order to measure the primary voltage. It is also foreseen that bushing current transformers would be implemented on both sides of the transformers, primarily on the grounds that they are typically much cheaper than other kinds of stand alone current transformers. Additionally, dead tank circuit breakers equipped with current bushing transformers on both sides could be implemented.

The provision of metering devices at the substation, motorised disconnect switches and motorised circuit breakers as well as data communications between the substation and other elements (such as a centralised command and control centre) allows the substation to be remotely monitored and controlled, in particular by a Supervisory Control And Data Acquisition (SCADA) system.

In the present illustrative embodiment, under normal operating conditions it is foreseen that both transformers will be in operation. This can be achieved by enabling all disconnect switches as in 34, 34' and 38, 38' and all circuit breakers as in 40, 44 and 44'. The system can also operate using a single transformer by isolating the other transformers via disconnect switch 38 or 38'. The appropriate circuit breaker 44 or 44' will also be disabled in this case. The tie circuit breaker 40 will normally remaining closed in order to allow electricity to continue to flow along the transmission lines 26. This allows the remaining disconnected transformer, for example, to be used as a back up in the case of heavy system load or fault of the other transformer.

In the event of a problem on either side of the transmission lines 26, for example involving neighbouring substations (not shown) tie circuit breaker 40 will open. Depending upon the time setting for the circuit breakers 44, 44' and clearance of the fault, both of these circuit breakers 44, 44' may open. The SCADA system will then open the appropriate motor operated disconnect switch 34, 34' depending on the location of the fault. In this manner the substation 22 will be isolated from the fault and can once again be energised by closing the circuit breakers 40, 44, 44' to operate one or both of the transformers, which will then be fed from the non-faulty side of the transmission line 26.

Figure 5:
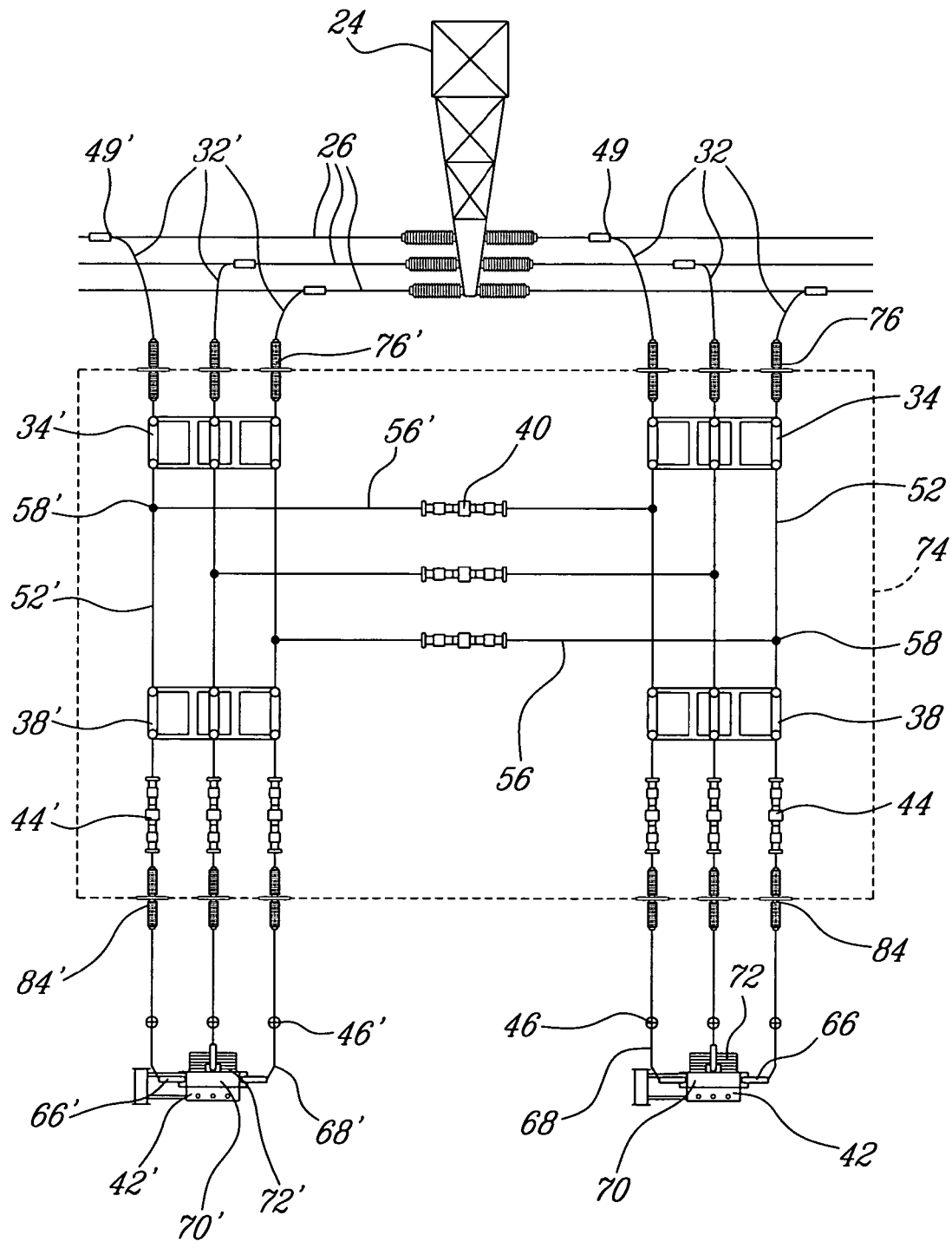
FIG. 5 provides a top plan view of a distribution substation in accordance with an alternative illustrative embodiment of the present invention.
Figure 6:
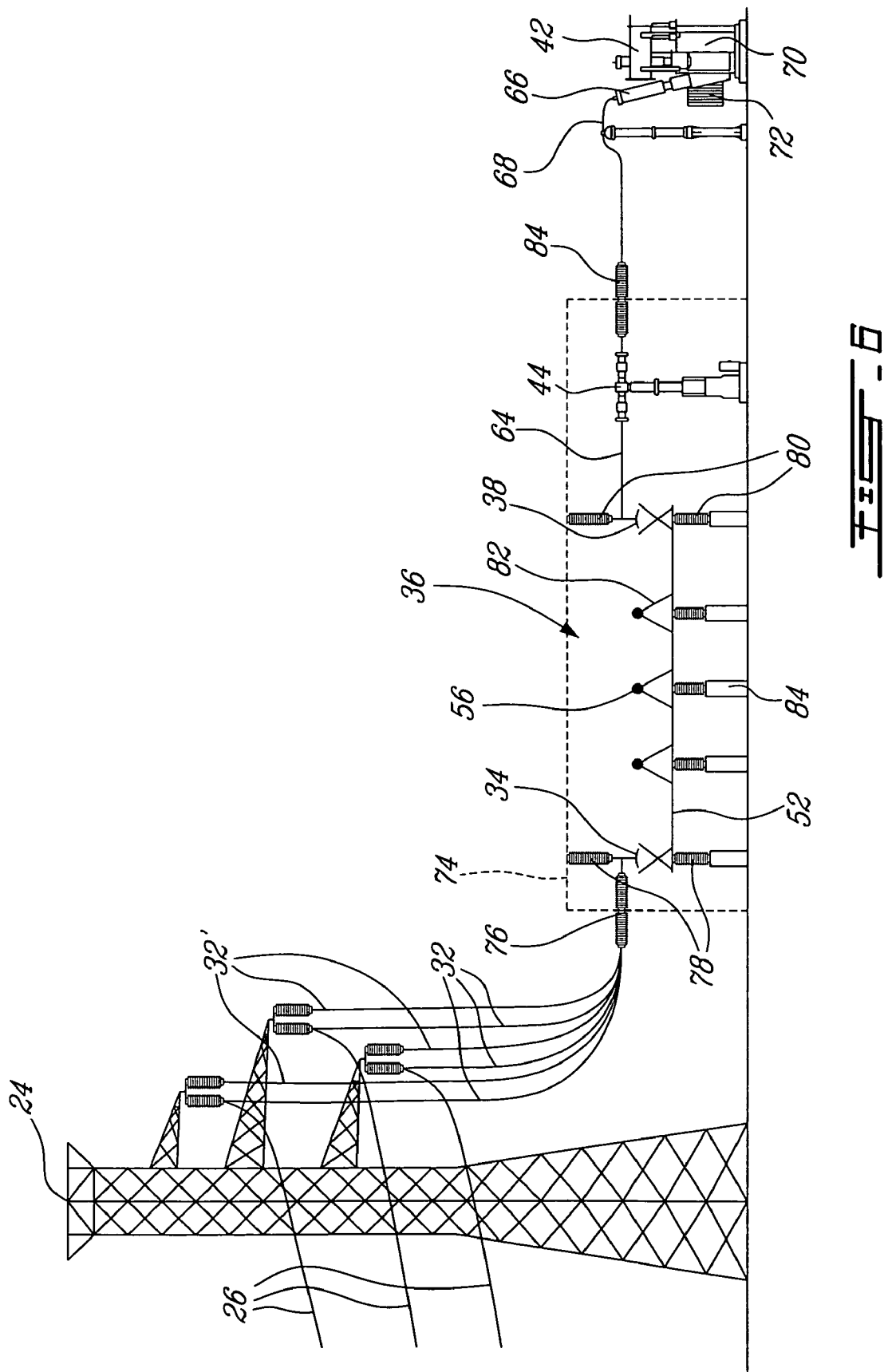
FIG. 6 provides a side plan view of a distribution substation in accordance with an alternative illustrative embodiment of the present invention.

Referring now to FIG. 5 and FIG. 6, an alternative illustrative embodiment of the present invention is disclosed. It will again be understood that although in the figures in many cases an element only on a single phase is referenced using a given reference numeral, the illustrated system is a three phase system and therefore the references should be understood, where applicable, to be also referring to the same elements on the other phase.

In the alternative embodiment the switching equipment, comprised of the first disconnect switches 34, 34' second disconnect switches 38, 38' and the transformer circuit breakers are enclosed in a building 74. The high voltage conductors 32, 32' are fed into the building via a series of wall bushings 76, 76' which maintain the high voltage conductors 32, 32' in isolation from the walls of the building 74. The high voltage conductors 32, 32' are terminated by disconnect switches 34, 34' which are mounted on insulated posts as in 78 and connected to the bus 36, 36' and a second set of disconnect switches 38, 38' via conductors 52, 52'. The second disconnect switches 38, 38' are also mounted on insulated posts 80, 80'. Additionally, in this alternative illustrative embodiment the disconnect switches 34, 34' and 38, 38' are pantograph disconnect switches.

The bus 36, 36' is comprised of conductive triangles as in 82, 82' mounted on insulated poles as in 84, 84'. The conductive triangles 82, 82' provide both support for the first ends of the conductors 56, 56' as well as a conductive path allowing electricity to flow between a given conductor 52/conductor 56, conductor 52'/conductor 56' pair. The second ends of the conductors 56, 56' are terminated at the tie circuit breakers 40. The second disconnect switches 38, 38' are connected to their respective circuit breakers 44, 44' by conductors 64, 64'. The circuit breakers 44, 44' are connected to the primary 66, 66' of the transformer 42, 42' by means of conductors 68, 68' which penetrate the outside wall of the building 74 by means of wall bushings 84, 84' which maintain the conductors 68, 68' in isolation. Note that in a second alternative embodiment, the conductive triangles 82, 82' could be suspended from the ceiling of the building 74 by means of appropriately designed insulating posts (not shown).

Figure 7B:
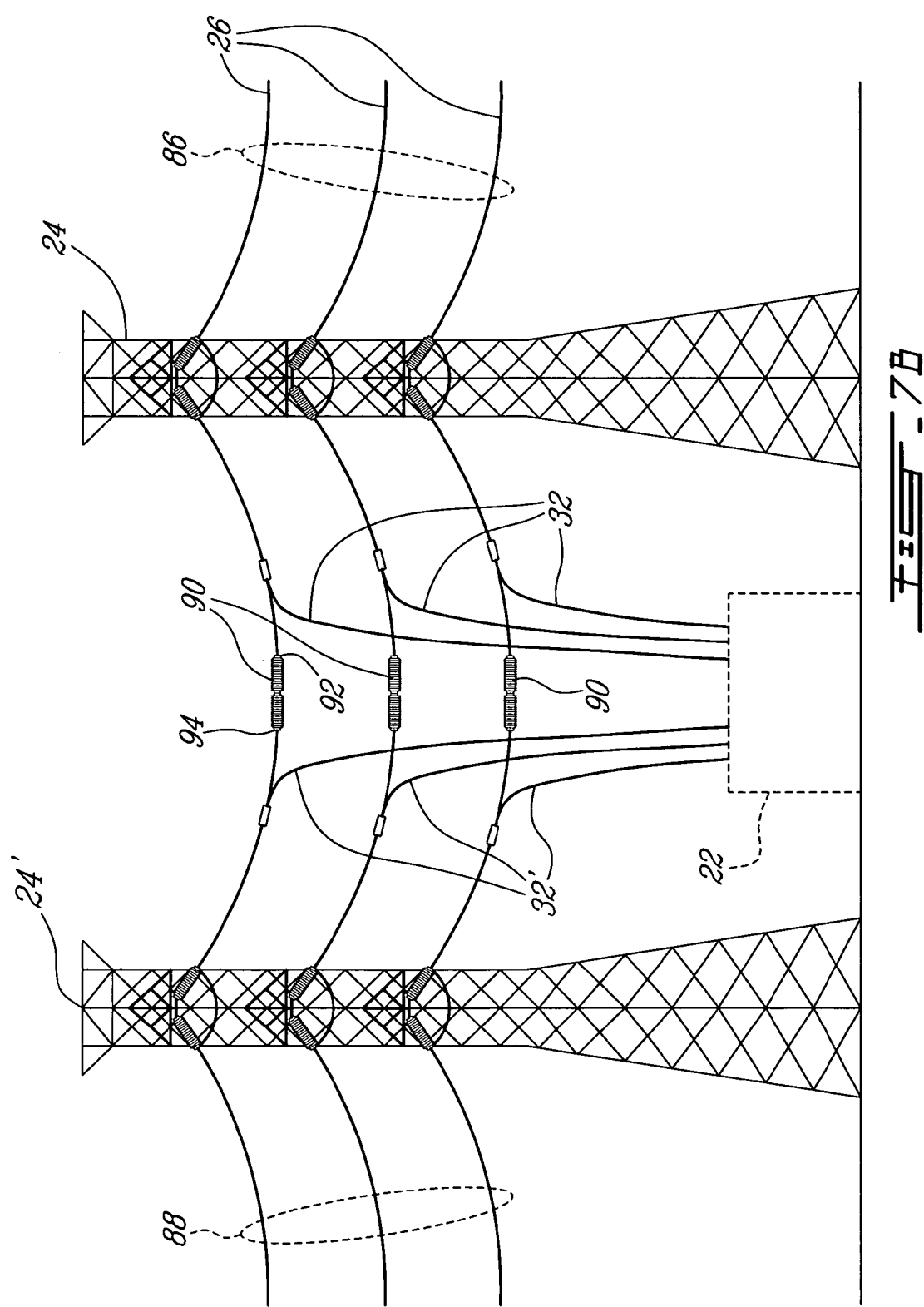
FIG. 7B provides a side plan view of a pair of suspension towers and tapped transmission line in accordance with a second illustrative embodiment of the present invention.

Referring now to FIG. 7A and FIG. 7B, two alternative but non-limiting embodiments for tapping the high voltage transmission lines 26 are disclosed.

In FIG. 7A, substation 22 is located in proximity to a given suspension tower 24 from which the transmission lines 26 are suspended by means of insulators as in 28. As discussed above, typically a bypass loop as in 30 is formed in each of the transmission lines 26 in the region of the suspension tower 24. By removing the bypass loops 30 the transmission line 26 can be severed into two groups of conductors 86 and 88 which are no longer in electrical contact. High voltage conductors 32, 32' are then tapped (through high voltage connectors, not shown) into the high voltage transmission lines 26 on opposite sides of the suspension tower 24 and used to convey high voltage electricity to the non-conventional substation 22.

In FIG. 7B, an alternative approach to tapping the high voltage transmission lines 26 is disclosed. In order to divide the high voltage transmission lines 26 into two groups of conductors 86 and 88 which are no longer in electrical contact, the high voltage transmission lines 26 are severed and a suitable insulating sections as in 90 introduced between the severed ends as in 92, 94. High voltage conductors 32, 32' are then spliced into the high voltage transmission lines 26 on opposite sides of the insulating sections 78.

Although the present invention has been described hereinabove by way of an illustrative embodiment thereof, this embodiment can be modified at will, within the scope of the present invention, without departing from the spirit and nature of the subject of the present invention.

What is claimed is:

1. A method of tapping a high voltage transmission line for input into a power distribution substation, the high voltage transmission line being suspended by a suspension tower, the method comprising the steps of:

(a) dividing the high voltage transmission line into a first conducting line and a second conducting line by removing a bypass loop to sever the transmission line at the suspension tower such that said first conducting line is terminated at a first side of said suspension tower and said second conducting line is terminated at a second side of said suspension tower, wherein said first conducting line is insulated from said second conducting line;

(b) providing at least two transformer bays at the substation, each transformer bay having a primary input connected to the primary of a power transformer, wherein said primary input comprises a series connected first disconnect switch, second disconnect switch and circuit breaker, wherein a bus interconnects said first disconnect switch and said second disconnect switch and wherein an output of said circuit breaker is attached to the primary of said power transformer;

(c) interconnecting the bus of said first transformer bay to the bus of said second transformer bay using a circuit breaker; and (d) connecting the first conducting line to the primary input of said first transformer bay using a first high voltage conductor and connecting the second conducting line to the primary input of said second transformer bay using a second high voltage conductor.

2. The method of claim 1 wherein the high voltage transmission line is a three phase transmission line having at least one conductor for each phase, said dividing step further comprising severing each conductor of each phase and inserting an insulating medium between the severed ends of each conductor.

3. The method of claim 2, wherein said insulating medium is air.

4. The method of claim 2, wherein said insulating medium is selected from the group consisting of porcelain, glass and epoxy.

5. The method of claim 2, wherein said first and said second conducting lines and said first and said second high voltage conductors each comprise three conductive cables, one of said cables for each phase.

6. The method of claim 1, wherein the voltage of the high voltage transmission line is between 65 kV and 765 kV.

7. A system for the conversion of high voltage electricity on a transmission line to medium voltage electricity comprising:

(a) an insulator dividing the high voltage transmission line into a first conducting line and a second conducting line;

(b) a substation comprising two transformer bays, each transformer bay comprising a primary input, switching equipment, and a power transformer, wherein said primary input is connected to the primaries of said power transformer through said switching equipment, wherein said switching equipment comprises a series connected first disconnect switch, second disconnect switch and circuit breaker, wherein a bus interconnects said first disconnect switch and said second disconnect switch and wherein the secondaries of said power transformer output the medium voltage electricity;

(c) a circuit breaker interconnecting the bus of said first transformer bay to the bus of said second transformer bay;

(d) first and second high voltage conductors for tapping the high voltage transmission line at one location on the high voltage transmission line, said first high voltage conductor connecting said first conducting line to said primary input of said first transformer bay and said second high voltage conductor connecting said second conducting line to said primary input of said second transformer bay; and (e) a suspension tower at said location, said suspension tower suspending the high voltage transmission line and having a bypass loop removed to provide first and second connection points, said first conducting line for joining to said first high voltage conductor at said first connection point on a first side of said tower, and said second conducting line for joining to said second high voltage conductor at said second connection point on a second side of said tower.

8. The system of claim 7, wherein each of said transformer bays further comprises a lightening arrester connected to each primary of said power transformer.

9. The system of claim 7, wherein said switching equipment further comprises a capacitor voltage transformer with wave trap series connected with said first disconnect switch, said second disconnect switch and said circuit breaker.

10. The system of claim 9, further comprising metering equipment operationally connected to said capacitor voltage transformer.

11. The system of claim 7, wherein said insulator is air.

12. The system of claim 7, wherein said insulator is selected from the group consisting of porcelain, glass and epoxy.

13. The system of claim 7, wherein the high voltage electricity is between 65 kV and 765 kV and the medium voltage electricity is between 4 kV and 46 kV.

14. The system of claim 7, wherein the high voltage transmission line is a three phase transmission line having at least one conductor for each phase.

15. The system of claim 14, wherein said first and second conducting lines and said first and second high voltage conductors each comprise three conductive cables, one of said cables for each phase.

* * * * *